US006400657B1

(12) United States Patent
Soeda et al.

(10) Patent No.: US 6,400,657 B1
(45) Date of Patent: Jun. 4, 2002

(54) METHOD OF SELECTING MEDIUM IN OPTICAL DISK MEMORY DEVICE AND OPTICAL DISK MEMORY SYSTEM

(75) Inventors: Kazuhiro Soeda, Ebina; Yuichi Kobayashi, Zama; Kazuaki Tanaka, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 09/589,066

(22) Filed: Jun. 8, 2000

(30) Foreign Application Priority Data

Jun. 9, 1999 (JP) .......................................... 11-162499

(51) Int. Cl.[7] .............................................. G11B 17/22
(52) U.S. Cl. ..................................... 369/30.06; 707/204
(58) Field of Search .......................... 369/30.05, 30.06, 369/30.19, 30.2, 30.28, 30.38, 34.1, 30.01; 707/204

(56) References Cited

U.S. PATENT DOCUMENTS 5,623,471 A * 4/1997 Prigge .......................... 369/84
6,014,352 A * 1/2000 Kubota et al. ................. 369/34
6,128,698 A * 10/2000 Georgis ....................... 711/111

FOREIGN PATENT DOCUMENTS

| JP | 64-48264 | * | 2/1989 |
| JP | 1-290170 | * | 11/1989 |
| JP | 7-93110 | | 4/1995 |
| JP | 11-194964 | | 7/1999 |

* cited by examiner

*Primary Examiner*—Tan Dinh
(74) *Attorney, Agent, or Firm*—Antonelli, Terry, Stout & Kraus, LLP

(57) ABSTRACT

An optical disk recording system includes a plurality of slots housing portable optical memory media and operative to select a desired optical recording medium to perform data read/write or includes a plurality of recording media housed in a magazine having the function of replacement. It is decided, during writing data to a recording medium, whether writing to the recording medium held in a slot is permissible and if writing is impermissible, writing to a recording medium of another slot is carried out. In the case of a medium exchangeable memory device having a detachable magazine having a plurality of slots, when writing to a slot of one magazine is impermissible, writing to a recording medium held in a slot of another magazine is carried out. Writing can be carried out without considering the state of the recording medium.

18 Claims, 9 Drawing Sheets

FIG. 2

MEDIUM STATE

| MEDIUM NUMBER | PRESENCE OF EFFECTIVE MEDIUM |
|---|---|
| 1 | × |
| 2 | ○ ← MEDIUM FROM WHICH BACKUP STARTS |
| 3 | ○ |
| 4 | ○ |
| 5 | ○ |

MAGAZINE 1

FIG. 3A

| MEDIUM NUMBER | PRESENCE OF EFFECTIVE MEDIUM |
|---|---|
| 1 | × |
| 2 | ○ |
| 3 | ○ |
| 4 | ○ |
| 5 | ○ |

MAGAZINE 1 (INVALID) — NOT USED FOR BACKUP

FIG. 3B

| MEDIUM NUMBER | PRESENCE OF EFFECTIVE MEDIUM |
|---|---|
| 1 | ○ |
| 2 | ○ |
| 3 | ○ |
| 4 | ○ |
| 5 | ○ |

MAGAZINE 2 (VALID) — USED FOR BACKUP

FIG. 4A

| MEDIUM NUMBER | PRESENCE OF EFFECTIVE MEDIUM |
|---|---|
| 1 | ○ |
| 2 | × |
| 3 | ○ |
| 4 | ○ |
| 5 | ○ |

MAGAZINE 1

← NOT USED FOR BACKUP

} MEDIA UNUSABLE FOR BACKUP

FIG. 4B

| MEDIUM NUMBER | PRESENCE OF EFFECTIVE MEDIUM |
|---|---|
| 1 | ○ |
| 2 | ○ |
| 3 | ○ |
| 4 | ○ |
| 5 | ○ |

MAGAZINE 2

← STORAGE OF SUCCESSIVE BACKUP DATA

FIG. 5

MEDIUM STATE

| MEDIUM NUMBER | PRESENCE OF EFFECTIVE MEDIUM |
|---|---|
| 1 | ○ |
| 2 | ✕ |
| 3 | ○ |
| 4 | ○ |
| 5 | ○ |

MAGAZINE 1

← USED FOR BACKUP

← STORAGE OF SUCCESSIVE BACKUP DATA OF MEDIUM 1

FIG. 6

MEDIUM STATE

| MEDIUM NUMBER | PRESENCE OF EFFECTIVE MEDIUM |
|---|---|
| 1 | ○ |
| 2 | ✕ |
| 3 | ○ |
| 4 | ○ |
| 5 | ○ |

MAGAZINE 1

← BACKUP IS SUSPENDED WHEN BACKUP TO MEDIUM 1 END

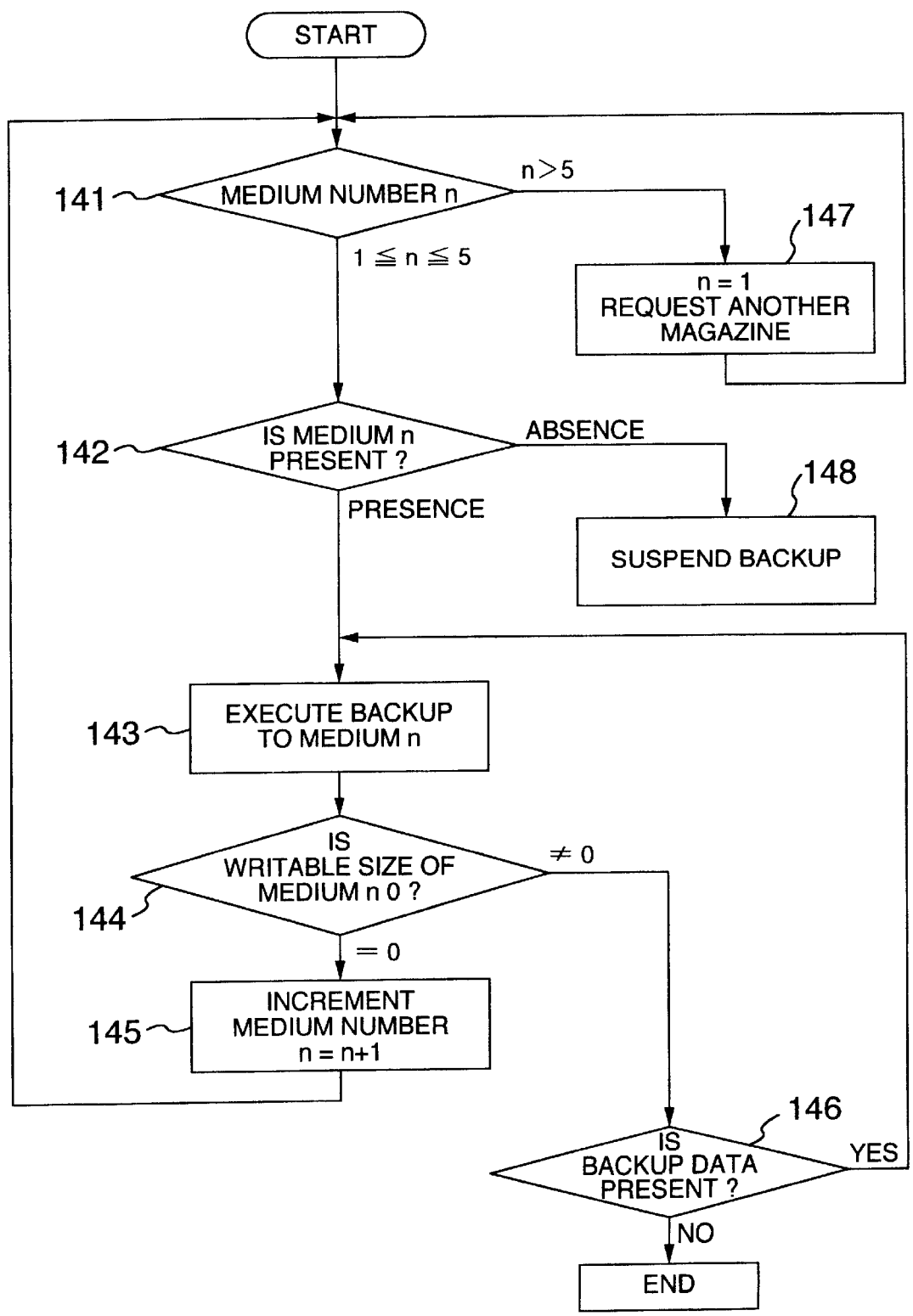

METHOD OF SELECTING MEDIUM IN OPTICAL DISK MEMORY DEVICE AND OPTICAL DISK MEMORY SYSTEM

CROSS-REFERENCE TO RELATED APPLICATION

This application relates to U.S. Patent Application Serial No. to be assigned, based on Japanese Patent Application No. 11-162500 filed Jun. 9, 1999, entitled "METHOD FOR SHARED USE OF MEDIUM-EXCHANGEABLE STORAGE DEVICE FOR PURPOSES OF BACKUP AND FILE SYSTEM, AND MEDIUM-EXCHANGEABLE RECORDING SYSTEM", by Y. Kobayashi, et al., the disclosure of which is incorporated herein by reference.

BACKGROUND OF THE INVENTION

The present invention relates to a technology for controlling an optical disk memory device and an optical disk memory system, and more particularly to a technology effectively applicable to, for example, a backup technique utilizing a medium exchangeable memory device.

As known in the art, in an information processing system such as personal computer or work station, a memory device of large capacity, for example, a streaming tape device such as cassette streamer or DAT (digital audio tape recorder) is used as a backup device for large-capacity data in a memory device such as hard disk device.

On the other hand, the storage capacity of the medium exchangeable memory device represented by, for example, a DVD-RAM device has been improved remarkably in recent years and a device of this type capable of realizing a storage capacity per unit portable recording medium which is comparable to that of the aforementioned steaming tape device or DAT has shown itself. Generally, the DVD-RAM device can afford to access recording media of different capacities or read-only media such as DVD-ROM and CD-ROM.

Then, it is conceivable to use the medium exchangeable memory device of large capacity represented by, for example, the DVD-RAM as a backup device. In backup utility software attached to, for example, a general-purpose operating system (OS), however, its write destination is fixed to a device for backup, for example, the streaming tape device such as cassette streamer or DAT. The format of the backup dedicated device differs from the standard file format of the OS and therefore, when the medium exchangeable memory device is allocated as it is to the backup memory device, it cannot be used in common to an OS file system to raise a problem that usability of the large-capacity medium exchangeable memory device is degraded.

Further, in a medium exchangeable memory device having a plurality of recording media housed in, for example, a magazine and having the function to replace the magazine, it is necessary to consider whether a recording medium of magazine serving as a data backup destination is mounted.

Besides, consideration must be taken as to whether a different kind of medium other than that for backup coexists in the recording device.

SUMMARY OF THE INVENTION

An object of the present invention is to provide, in a medium exchangeable memory device having the function to replace a plurality of portable recording media housed in a magazine, a technology for executing smooth data backup without being affected by the kind and state of the plurality of portable recording media in the magazine.

Another object of the invention is to provide a technology for improving usability by using the medium exchangeable memory device in common to data backup and an OS file system.

According to the present invention to solve the above objects, in a medium exchangeable memory device having a plurality of slots for housing portable optical memory media and being operative to select a desired optical recording medium to read/write data, a recording medium held in a slot is decided as to whether it is permitted to be written and when writing is not permitted, writing to a recording medium in another slot is carried out. Further, in a medium exchangeable memory device having a detachable magazine provided with a plurality of slots, when a recording medium in a slot is not permitted to be written, writing to a recording medium held in another slot of the magazine is carried out.

Further, according to the invention, an identification number is assigned to a unit of recording medium or slot holding the recording medium and it is decided whether write of data to a recording medium assigned with a designated identification number or a recording medium of a slot assigned with the designated identification number is permissible. If writing is impermissible, data is written to a recording medium assigned with an identification number which is next as viewed in the order of increasing of identification number or a recording medium of a slot assigned with the next identification number.

Determination as to whether the recording medium is permitted to be written is carried out through the following method. More particularly, (1) it is decided whether a recording medium is housed in a slot having a designated identification number, (2) it is decided whether the recording medium is a read-only medium such as DVD-ROM or CD-ROM, and (3) it is decided whether the recording medium is formatted to another file system.

Further, in a medium exchangeable memory device having a plurality of recording media housed in, for example, a magazine and having the function to replace the magazine, it is decided whether write of data to a recording medium assigned with a designated identification number or a recording medium in a slot assigned with the designated identification number is permissible and when writing is impermissible, writing to a recording medium in another magazine is carried out.

BRIEF DESCRIPTION OF THE DRAWINGS

FIG. 2 is a conceptive diagram for explaining an example of a method of controlling the optical disk memory device according to the embodiment of the invention.

FIGS. 3A and 3B are conceptive diagrams for explaining another example of a method of controlling the optical disk memory device according to the embodiment of the invention.

FIGS. 4A and 4B are conceptive diagrams for explaining still another example of a method of controlling the optical disk memory device according to the embodiment of the invention.

FIG. 5 is a conceptive diagram for explaining still another example of a method of controlling the optical disk memory device according to the embodiment of the invention.

FIG. 6 is a conceptive diagram for explaining still another example of a method of controlling the optical disk memory device according to the embodiment of the invention.

FIG. 11 is a flow chart corresponding to the optical disk memory device control method of FIG. 6.

DESCRIPTION OF THE EMBODIMENTS

The present invention will now be described by way of example with reference to the accompanying drawings.

Figure 1:
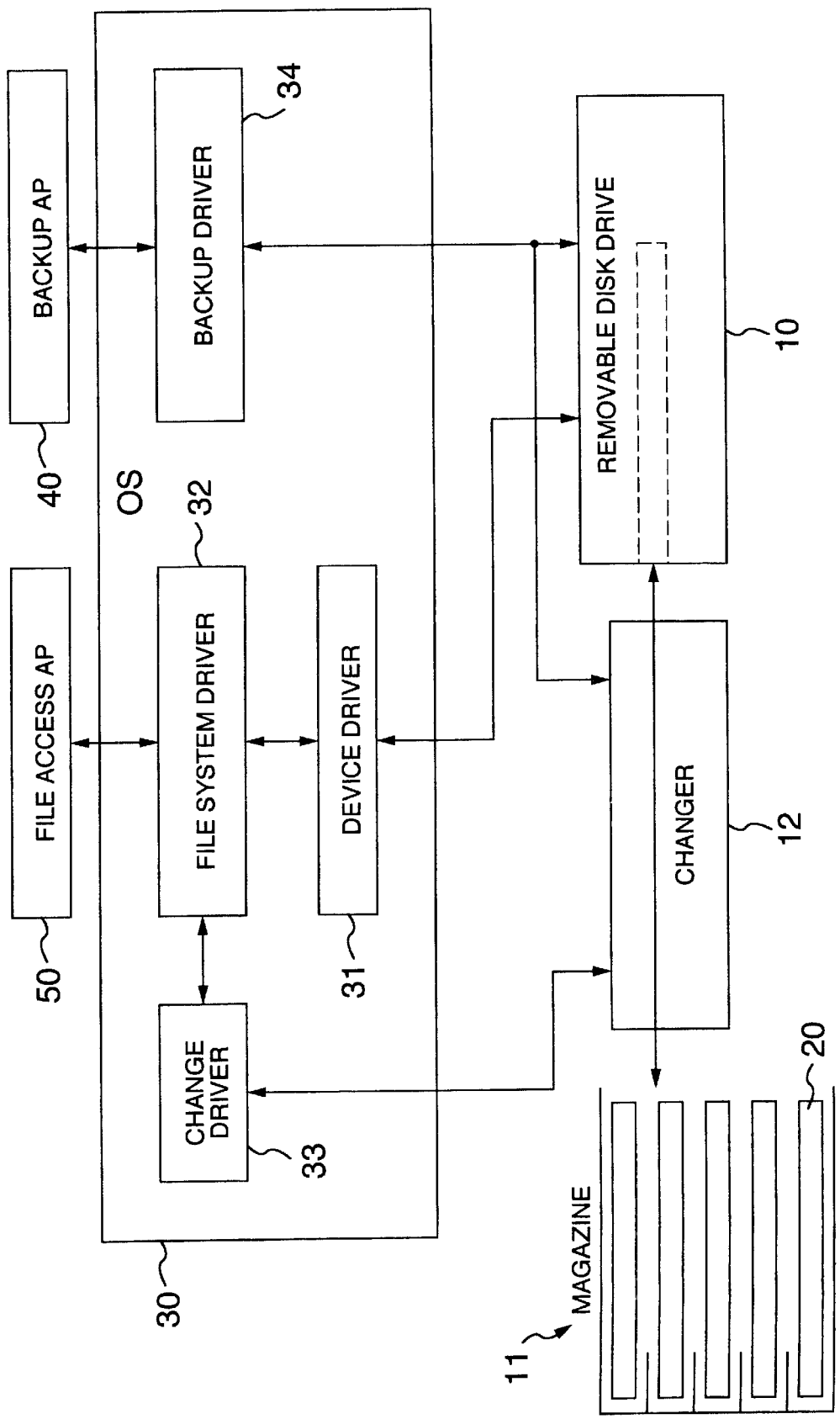
FIG. 1 is a conceptive diagram showing an example of construction of an optical disk memory system practicing a method of controlling of an optical disk memory device according to an embodiment of the present invention.

Referring to FIG. 1, an optical disk system for practicing a method of controlling an optical disk memory device according to an embodiment of the invention comprises a removable disk drive 10, a removable media 20, an operating system (OS) 30, an backup application program 40 to be operated on the operating system 30, and a file access application program 50 to be operated on the operating system 30.

In the case of the present embodiment, the disk drive 10 includes a changer 12 which performs automatic operation of replacement of the plurality of removable media 20 housed in a magazine 11.

In the present embodiment, the operating system 30 includes a device driver 31 for controlling the removable disk drive 10, a driver 32 for file system for accessing a general purpose file system provided by the operating system 30 and constructed on a removable medium 20, a changer driver 33 for controlling the replacement operation by the changer 12, and a driver 34 for backup operative to access the removable disk driver 10 and the removable media 20 during data backup operation.

The backup driver 34 in the present embodiment has the function to exclusively share each of the plurality of removable media 20 housed in the magazine 11 in OS file system operation and data backup operation. In the case of the present embodiment, as an example, the backup driver 34 has the function to permit a data backup process which emulates a tape device such as DAT or streaming tape device to reckon the plurality of removable media 20 in the magazine 11 as tape media, with the result that data backup can be executed without changing the backup application program 40 which is operated by presupposing the tape media and the like.

When it comes to considering the housing condition of the plurality of removable media 20 in the magazine 11, the total number (5 in this case) is not always loaded.

In other words, there is a state in which some of the plurality of removable media 20 of the same kind are unloaded. Besides, in case the removable disk drive 10 has the function to read/write different kinds of removable media 20, for example, DVD-RAM's, CD-R's and CD-ROM's, these removable media 20 of different types conceivably coexist in the magazine 11.

In the following description, object media undertaking data backup are removable media 20 represented, as an example, by DVD-RAM's and a state in which a removable medium 20 of data backup object represented by a DVD-RAM in the magazine 11 is unloaded or replaced with another removable medium 20 not serving as data backup object is called a deficit of removable medium 20. Further, when a removable medium 20 formatted to permit the file system to read/write this medium is loaded, writing of backup data is prevented and therefore, this state is also called a deficit of removable medium.

Examples of packaging or loading states of the plurality of removable media 20 in the magazine 11 are shown in FIGS. 2 to 6. Individual removable media 20 are assigned with medium numbers 20a unique to the magazine 11. Access to a particular removable medium 20 in a given magazine 11 is designated by using a medium number 20a. In the figure, " " mark indicates the deficit of a removable medium 20 of data backup object as defined above and "○" mark indicates the presence of a removable medium 20 of data backup object.

Examples of the optical disk memory device control method in the present embodiment will be described.

A. Instance Where the First Removable Medium 20 is Deficient

When the first removable medium 20 of the smallest medium number 20a in the magazine 11 is deficient, three events are conceivable including (1) an event in which another removable medium 20 present in the same magazine 11 is detected and used as a data backup destination medium (FIG. 2), (2) an event in which the magazine 11 in question is reckoned as defective one and loading of a different magazine 11 is requested (FIGS. 3A and 3B) and (3) an event in which data backup is suspended.

Operation in the event (1) and that in the event (2) will be described with reference to flow charts of FIGS. 7 and 8, respectively.

Figure 7:
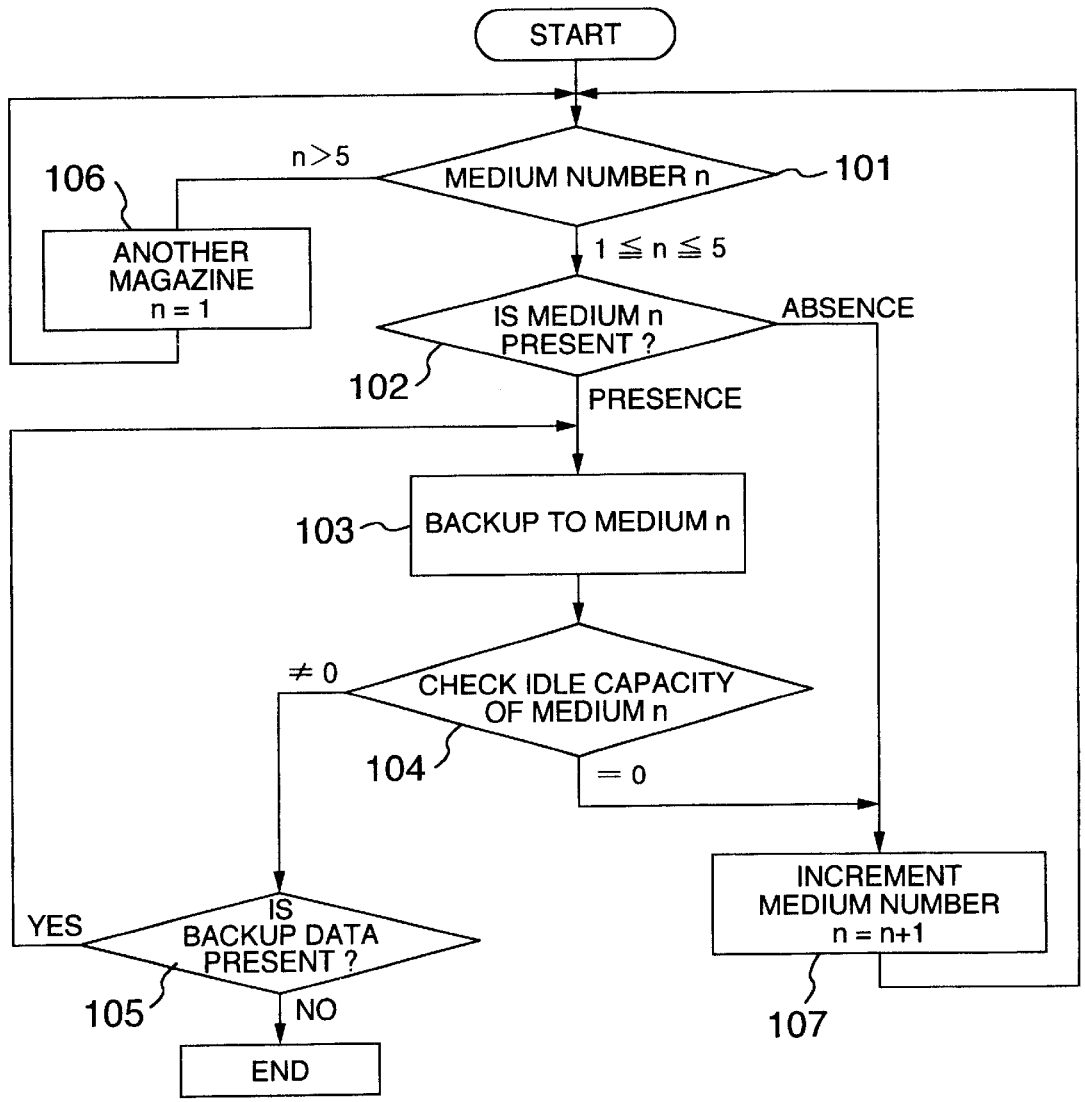
FIG. 7 is a flow chart corresponding to the optical disk memory device control method of FIG. 2.

In the case of event (1), as exemplified in FIG. 7, it is first decided whether a designated medium number n is within the range (1 to 5) of removable media 20 housed in the magazine 11 in question (step 101). If the designated medium number is within the range, it is examined whether a corresponding removable medium is present in the magazine 11 (step 102). If present, data backup to the designated medium n is executed (step 103) and an idle capacity of that medium is examined (step 104). If the medium is idle, the presence or absence of residual backup data is examined (step 105) and if present, the steps ensuing the step 103 are repeated.

When it is determined in the step 104 that the present removable medium 20 is not idle, the medium number n is incremented (step 107) and the program returns to the step 101.

When the medium number n is determined to be in excess of the range of the present magazine 11 in the step 101, the medium number n is initialized to 1 and loading of another magazine 11 is requested (by responding to, for example, EOT:End of Tape in the case of emulation of tape medium) (step 106). Then, the program returns to the step 101.

In this manner, as exemplified in FIG. 2, backup can be started from a medium number n=2 corresponding to a medium representing the first backup object as viewed from the head side of medium number 20a.

Figure 8:
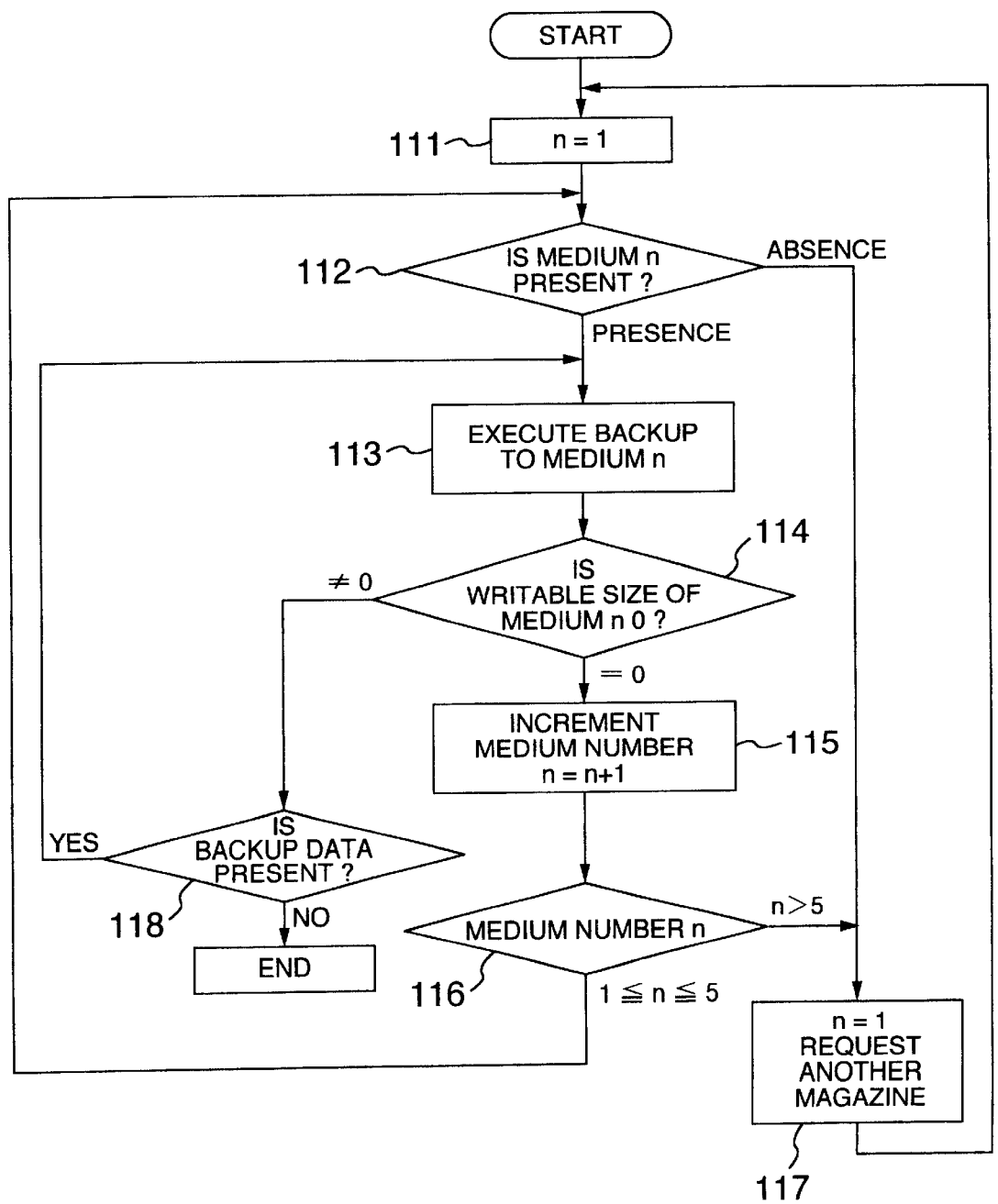
FIG. 8 is a flow chart corresponding to the optical disk memory device control method of FIGS. 3A and 3B.

The flow chart corresponding to the above event (2) is exemplified in FIG. 8. More particularly, the medium number n is initialized to 1 (step 111) and it is decided whether a corresponding medium is present in the magazine 11 (step 112). If present, data backup to the designated medium n is executed (step 113) and an idle capacity of that medium is examined (step 114). If idle, the presence or absence of residual backup data is examined (step 118). If present, steps ensuing the step 113 are repeated.

It is determined in the step 114 that the present removable medium 20 is not idle, the medium number n is incremented (step 115) and it is decided whether the medium number n is with n the range (1 to 5) of the removable media 20 housed in the magazine 11 in question (step 116). If the medium number is within the range, steps ensuing the step 111 are repeated.

If it is determined in the step 116 that the medium number n is in excess of the range, the medium number n is initialized to 1 and at the same time loading of another magazine 11 is requested (by responding to, for example, EOT:End of Tape in the case of emulation of tape medium) (step 117). Then, the program returns to the step 111.

The FIG. 8 flow chart corresponds also to the case of event (3). The presence of a medium is confirmed (step 112) and in the absence of the medium, the data backup processing is suspended in the step 117.

B. Instance Where the Second and Ensuing removable Media 20 are Deficient

When the second and ensuing removable media 20 are deficient in the magazine 11, the processing is divided into three events including (1) as an event in which loading of another magazine is requested (FIGS. 4A and 4B), (2) as an event in which a removable medium 20 for data backup existing in the same magazine is detected and determined as a data backup medium (FIG. 5) and (3) as an event in which media are, is determined to be defective and data backup is suspended (FIG. 6). The individual events will be described below in greater detail.

Figure 9:
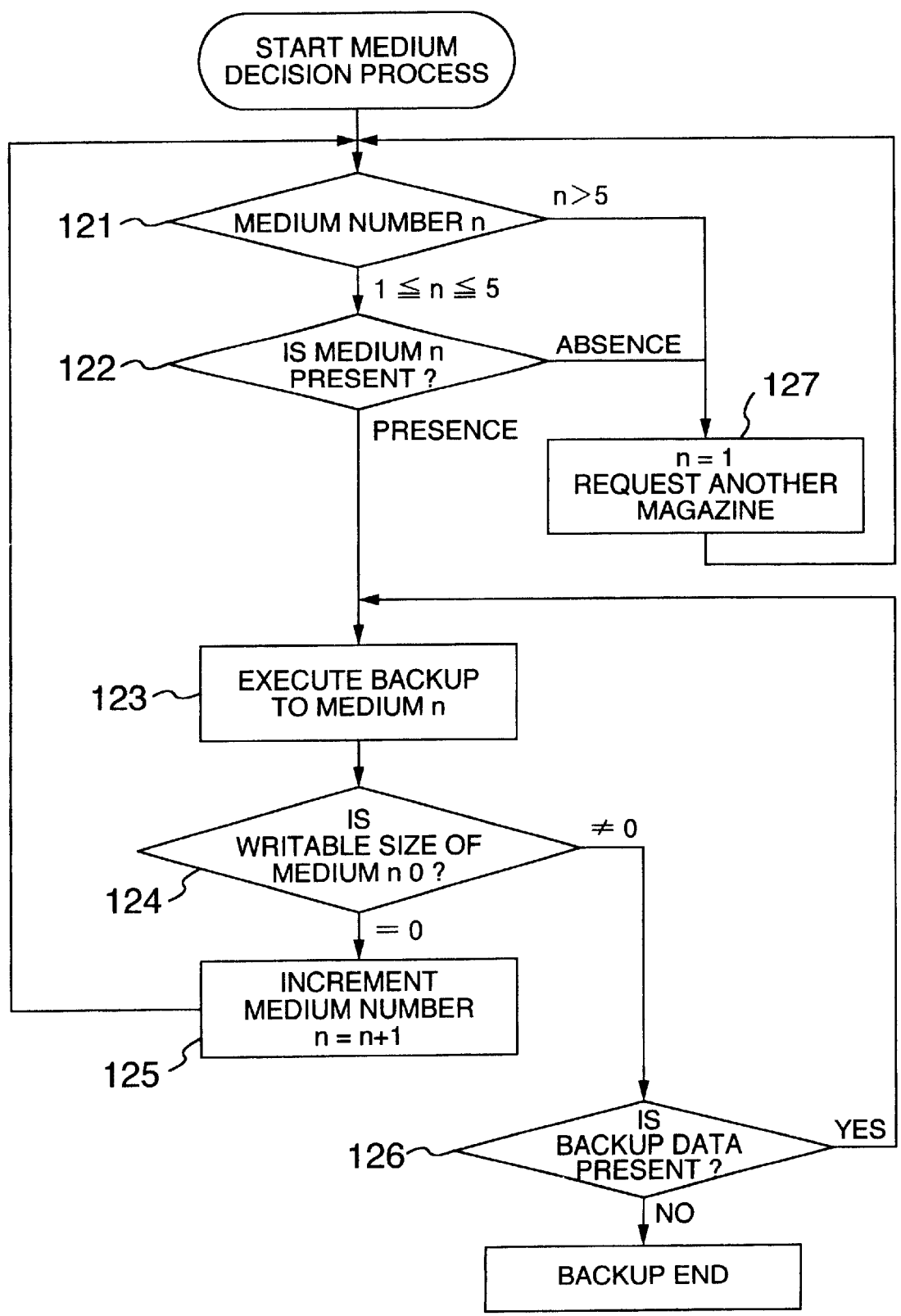
FIG. 9 is a flow chart corresponding to the optical disk memory device control method of FIGS. 4A and 4B.

The flow chart corresponding to the event (1) in which loading of another magazine is requested is exemplified in FIG. 9. Firstly, it is decided whether the medium number n within the range (1 to 5) of removable media 20 housed in the magazine 11 in question (step 121) and it is decided whether a corresponding medium is present in the magazine 11 (step 122). If present, data backup to the designated medium n is executed (step 123) and an idle capacity of that medium is examined (step 124). If the medium is idle, the presence or absence of residual backup data is examined (step 126) and if present, steps ensuing the step 123 are repeated.

When it is determined in the step 124 that the present removable medium 20 is not idle, the medium number n is incremented (step 125) and the steps ensuing the step 121 are repeated.

Regardless of the fact that the medium is determined to be within the range or in excess of the range in the step 121, the medium number n is initialized to 1 and loading of another magazine 11 is requested (by responding to, for example, EOT:End of Tape in the case of emulation of tape medium) (step 127) when the absence of the medium n in question is determined in the next step 122. Then, the program returns to the step 121.

Figure 10:
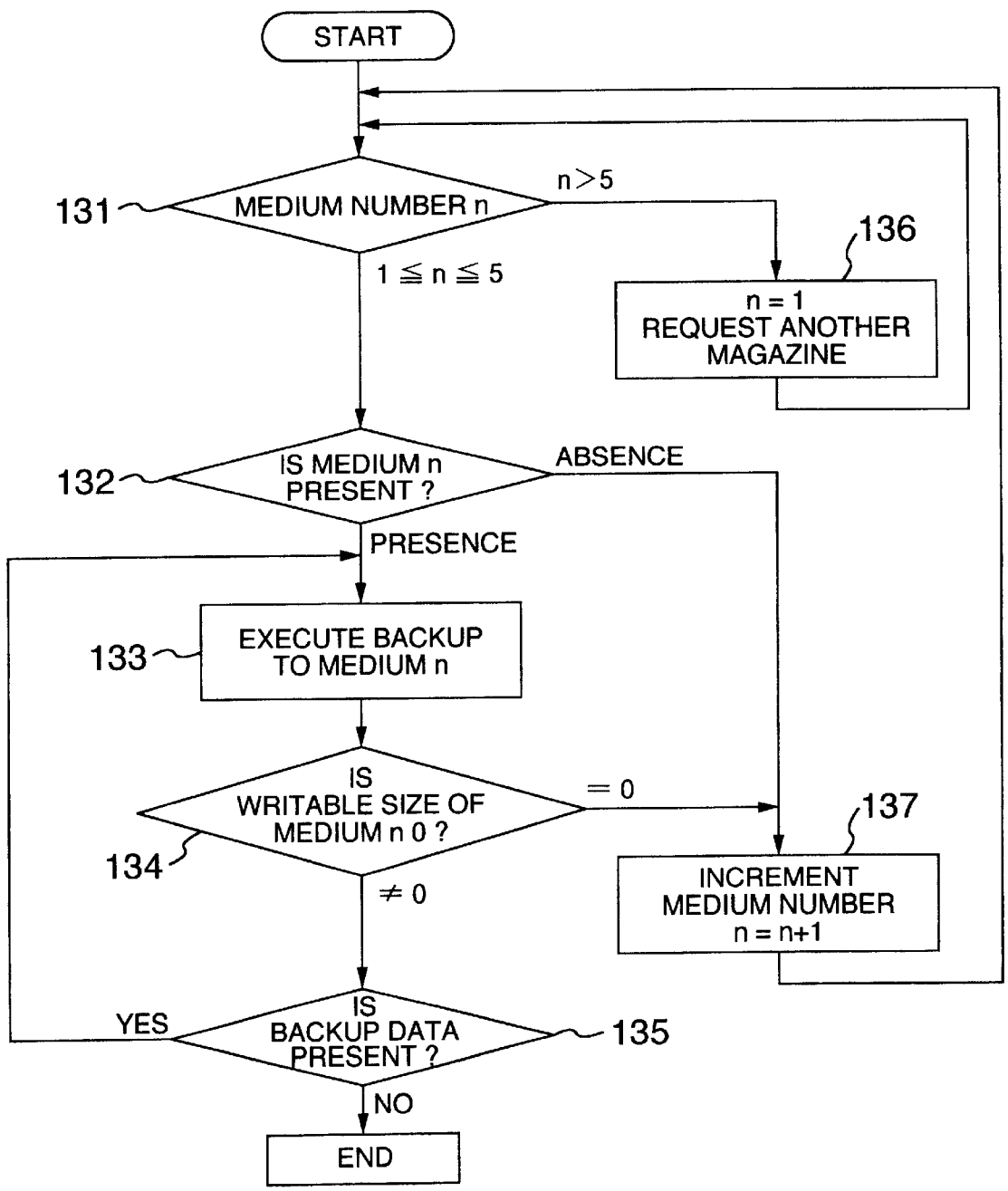
FIG. 10 is a flow chart corresponding to the optical disk memory device control method of FIG. 5.

The flow chart corresponding to the event (2) in which a removable medium 20 for data backup present in the same magazine is detected and determined to be a medium for data backup is exemplified in FIG. 10. Firstly, it is decided whether the medium number n is within the range (1 to 5) of the removable media 20 housed in the magazine 11 in question (step 131) and it is examined whether a corresponding medium is present in the magazine 11 (step 132). If present, data backup to the designated medium n is executed (step 133) and an idle capacity of that medium is examined (step 134). If idle, the presence or absence of residual backup data is examined (step 135). If present, steps ensuing the step 133 are repeated.

When the present removable medium 20 is determined not to be idle in the step 134, the medium number n is incremented (step 137) and steps ensuing the step 131 are repeated.

If the medium number is determined to be in excess of the range in he step 131, the medium number n is initialized to 1 and at the same time, loading of another magazine 11 is requested (by responding to, for example, EOT:End of Tape in the case of emulation of tape medium) (step 136). Then, the program returns to the step 131.

The flow chart corresponding to the event (3) in which the medium is determined to be defective and data backup is suspended is exemplified in FIG. 11. Firstly, it is decided whether the medium number n is within the range (1 to 5) of the removable media 20 housed in the magazine 11 in question (step 141) and it is examined whether a corresponding medium is present in the magazine 11 (step 142). If present, data backup to the designated medium n is executed (step 143) and then an idle capacity of that medium is examined (step 144). If the medium is idle, the presence or absence of residual backup data is examined (step 146) and if the data is present, steps ensuing the step 143 are repeated.

When the present removable medium 20 is determined not to be idle in the step 144, the medium number n is incremented step 145) and thereafter steps ensuing the step 141 are repeated.

When the medium number is determined to be in excess of the range in the step 141, the medium number n is initialized to 1 and loading of another magazine 11 is requested (by responding to, for example, EOT:End of Tape in the case of emulation of tape medium) (step 147). Then, the program returns to the step 141.

When the designated medium is determined not to be present in the magazine 11 in the step 142, data backup is suspended (step 148).

As described above, in the optical disk memory device controlling method and the optical disk memory system according to the present embodiment, the medium exchangeable memory device has the changer 12 for replacing the plurality of removable media 20 housed in the magazine 11, whereby accurate data backup can be executed without being affected by the state of housing of the plurality of removable media 20 in the magazine 11 such as deficit, the kind of the removable media and the format state thereof.

Further, usability can be improved by exclusively sharing the removable disk drive 10 in data backup operation and ordinary file system operation.

Besides, since the data backup is carried out by accurately discerning whether a medium is for data backup, the removable disk drive 10 can be used exclusively for the data backup and the OS file system.

In the foregoing, for simplification of explanation, the case where the single removable disk drive 10 is utilized and the magazine 11 capable of housing five removable media 20 is used is exemplified but for example, a plurality of (for example, m) removable disk drives 10 each having changer 12 may be provided and data backup over individual magazines 11 (removable media 20) of the m removable disk drives 10 may be executed.

In that case, the plurality of removable disk drives 10 may be operated by, for example, reckoning them as a single virtual drive. In other words, when taking m=5, for instance, the number of utilizable removable media 20 is set to 25 (5×5) and 1 to 25 may be set to the aforementioned decision range of medium number 20a in the steps 101, 116, 121 and 131. Then, a decision logic may be added for deciding which the designated removable medium 20 should belong to which a removable disk drive 10 belongs to one of the drives 10 in accordance with the medium number 20a.

The invention has been described concretely on the basis of the embodiments of the invention made by the present inventors but the foregoing embodiments of the invention are not limitative and can obviously be altered and changed in various ways without departing from the gist of the invention.

According to the invention, in the medium exchangeable memory device having the function to replace the plurality of portable recording media housed in the magazine, a recording medium to which data is written or a magazine can be selected in accordance with the deficient state of portable recording medium in the magazine and hence, smooth data backup can be executed without being affected by the state of the magazine.

Besides, according to the invention, the medium portable memory device can be used in common for the data backup and the OS file system to thereby improve usability.

What is claimed is:

1. A method of controlling a memory device having a plurality of exchangeable optical recording media, comprising the steps of:

selecting one of a plurality of slots housing the optical recording media in accordance with a command from a master unit;

detecting a residual recording capacity of an optical recording medium of the selected slot; and writing data to an optical recording medium of another slot, when the detected capacity is too deficient to be written with the data.

2. A memory device control method according to claim 1, wherein the data to be written to the optical recording medium is data of backup software to be written to a backup device such as streaming tape.

3. A memory device control method according to claim 1, wherein individual optical recording media are assigned with identification numbers, and when the capacity of an optical recording medium is too deficient to be written with data, the data is written to an optical recording medium of an identification number which is next as viewed in the order of increasing of identification number.

4. A method of controlling a memory device having a plurality of exchangeable optical recording media, comprising the steps of:

assigning identification numbers to individual slots housing the optical recording media;

deciding whether a slot of a designated identification number is in a deficient state in which data write is impermissible; and writing data successively to an optical recording medium of a slot having an identification number which is next as viewed in the order of increasing of identification number, when said slot of the designated identification number is deficient.

5. A memory device control method according to claim 4, wherein the deficient state is a state in which any optical recording medium is not housed in a slot for housing an optical recording medium.

6. A memory device control method according to claim 4, wherein the deficient state is a state in which an optical recording medium which is unwritable is housed in a slot for housing an optical recording medium.

7. A memory device control method according to claim 4, wherein the deficient state is a state in which an optical recording medium so formatted as to be unreadable/unwritable is housed in a slot for housing an optical recording medium.

8. A memory device control method according to claim 4, wherein in the case of the deficient state, writing of data to the optical recording medium is suspended.

9. A memory device control method according to claim 1, wherein in a memory device having a plurality of detachable magazines each having at least one slot, when write of data to an optical recording medium of another slot of one magazine is impermissible, the data is written successively to an optical recording medium housed in a slot of another magazine.

10. A memory device control method according to claim 4, wherein in a memory device having a plurality of detachable magazines each having at least one slot, when a slot of the next identification number in one magazine is in a deficient state, data is written successively to an optical recording medium housed in a slot of another magazine.

11. A memory device control method according to claim 10, wherein when a slot having the head identification number in one magazine is in a deficient state, data is written successively to an optical recording medium housed in a slot of another magazine.

12. An optical disk memory system having a plurality of exchangeable optical recording media, comprising:

a plurality of slots having identification numbers and operative to house the optical recording media; and an optical data backup controller which decides whether writing to a recording medium housed in a slot of a designated identification number is permissible and if impermissible, writes data to an optical recording medium of a slot having an identification number which is next as viewed in the order of increasing of identification number.

13. An optical disk memory system according to claim 12, wherein said data backup controller detects a capacity of the optical recording medium housed in the slot of the designated identification number to decide whether data write is permissible.

14. An optical disk memory system according to claim 12, wherein said data backup controller detects whether an optical recording medium is housed in the slot of the designated identification number to decide whether data write is permissible.

15. An optical disk memory system according to claim 12, wherein said data backup controller detects whether a read-only optical recording medium is housed in the slot of the designated identification number to decide whether data write is permissible.

16. An optical disk memory system according to claim 12, wherein said data backup controller detects whether an optical recording medium for file system is housed in the slot of the designated identification number to decide whether data write is permissible.

17. An optical disk memory system according to claim 12 further comprising a plurality of detachable magazines each having at least one slot, wherein when writing to an optical recording medium of another slot in one magazine is impermissible, said data backup controller writes data to an optical recording medium housed in a slot of another magazine.

18. An optical disk memory system according to claim 17, wherein when a slot having a designated head identification number in one magazine is unwritable, said data backup controller writes data successively to an optical recording medium housed in a slot of another magazine.

* * * * *